(12) United States Patent
Anderson et al.

(10) Patent No.: US 6,854,630 B2
(45) Date of Patent: Feb. 15, 2005

(54) BICYCLE CAR RACK AND WORK STAND

(76) Inventors: Evan R. Anderson, 12917 W. Oregon Dr., Lakewood, CO (US) 80228; Ganya M. Anderson, 12917 W. Oregon Dr., Lakewood, CO (US) 80228

(*) Notice: Subject to any disclaimer, the term of this patent is extended or adjusted under 35 U.S.C. 154(b) by 211 days.

(21) Appl. No.: 10/336,106

(22) Filed: Jan. 3, 2003

(65) Prior Publication Data

US 2003/0102343 A1 Jun. 5, 2003

Related U.S. Application Data

(63) Continuation of application No. 09/776,968, filed on Feb. 5, 2001, now Pat. No. 6,547,116.

(51) Int. Cl.$^7$ .................................................. B60R 9/06
(52) U.S. Cl. ...................... 224/536; 224/506; 224/924; 269/101
(58) Field of Search ................................ 224/504, 505, 224/506, 536, 924; 269/95, 101

(56) References Cited

U.S. PATENT DOCUMENTS

| | | |
|---|---|---|
| 3,947,010 A | 3/1976 | Zeller |
| 3,981,491 A | 9/1976 | Snyder |
| 4,676,413 A | 6/1987 | Began et al. |
| 4,676,414 A | 6/1987 | Deguevara |
| 4,887,754 A | 12/1989 | Boyer et al. |
| 5,277,346 A | 1/1994 | Stier |
| 5,303,857 A | 4/1994 | Hewson |
| 5,385,280 A | 1/1995 | Littlepage et al. |
| 5,423,566 A | 6/1995 | Warrington et al. |
| 5,469,997 A | 11/1995 | Carlson |
| 5,638,706 A | 6/1997 | Stevens |
| 5,647,521 A | 7/1997 | Burgess |
| 5,664,717 A | 9/1997 | Joder |
| 5,685,469 A | 11/1997 | Stapleton |
| 5,685,686 A | 11/1997 | Burns |
| 5,695,103 A | 12/1997 | Duvernay et al. |
| 5,775,555 A | 7/1998 | Bloemer et al. |
| 5,803,330 A | 9/1998 | Stack et al. |
| 5,845,831 A | 12/1998 | Nusbaum et al. |
| 5,857,602 A | 1/1999 | Depot |
| 5,950,891 A | 9/1999 | Brungardt et al. |
| 6,000,593 A | 12/1999 | Chimenti |
| 6,000,686 A | 12/1999 | Yates |
| 6,010,049 A | 1/2000 | Stein |
| 6,085,954 A | 7/2000 | Bloemer et al. |
| 6,123,498 A | 9/2000 | Surkin |
| 6,234,372 B1 | 5/2001 | Rivera |
| 6,283,349 B1 | 9/2001 | Morris et al. |
| 6,321,962 B1 | 11/2001 | Morris et al. |

FOREIGN PATENT DOCUMENTS

FR 2689468 10/1993

*Primary Examiner*—Stephen K. Cronin
(74) *Attorney, Agent, or Firm*—Sheridan Ross P.C.

(57) ABSTRACT

A combination bicycle car rack and work stand is provided. The device has one or more bicycle carrier channels to secure one or more bicycles, and a clamp assembly which can be oriented in a desired position in order to perform maintenance or repair on another mounted bicycle. The invention may be mounted to a vehicle, or may be mounted to a stationary base. If the clamp assembly is not in use, additional bicycles may be transported by removing the clamp assembly, and attaching a bike transport assembly which includes additional bike carrier channels. Enhanced structural support is provided on the support assembly of the device to ensure a strong and rigid connection with the hitch assembly of a vehicle. The clamp assembly is adapted to receive various sized components of a bicycle, and can be rotatably oriented with ease.

5 Claims, 4 Drawing Sheets

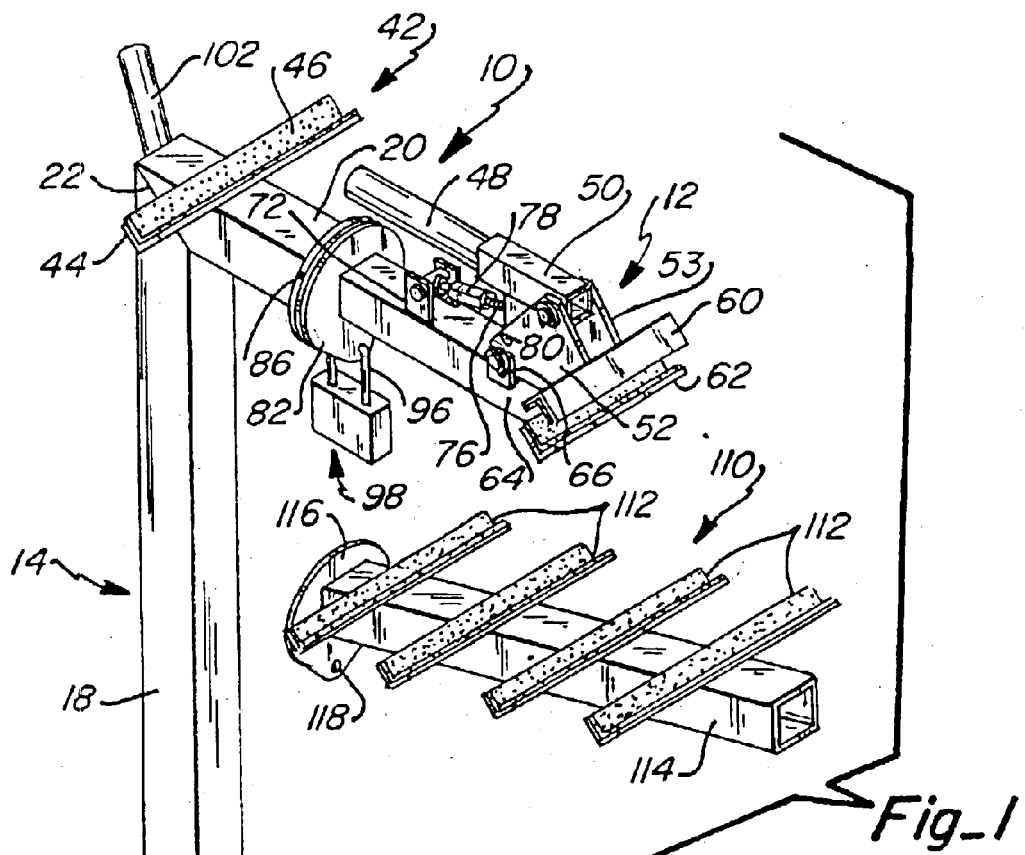
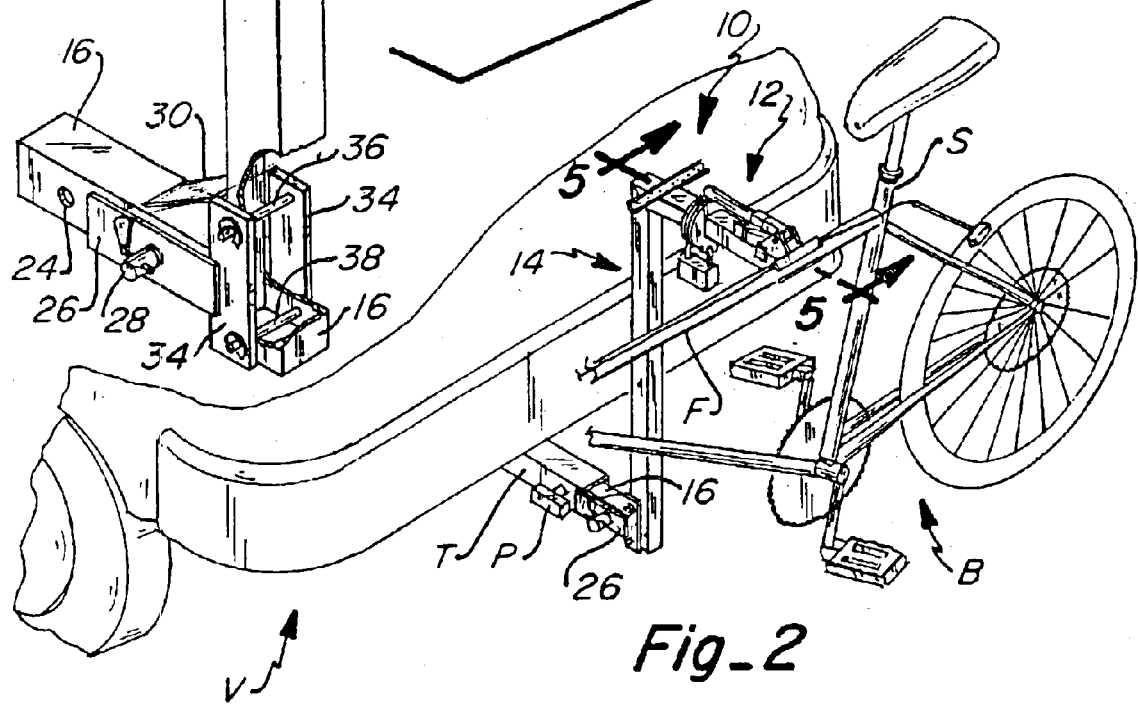
Fig_1
Fig_2

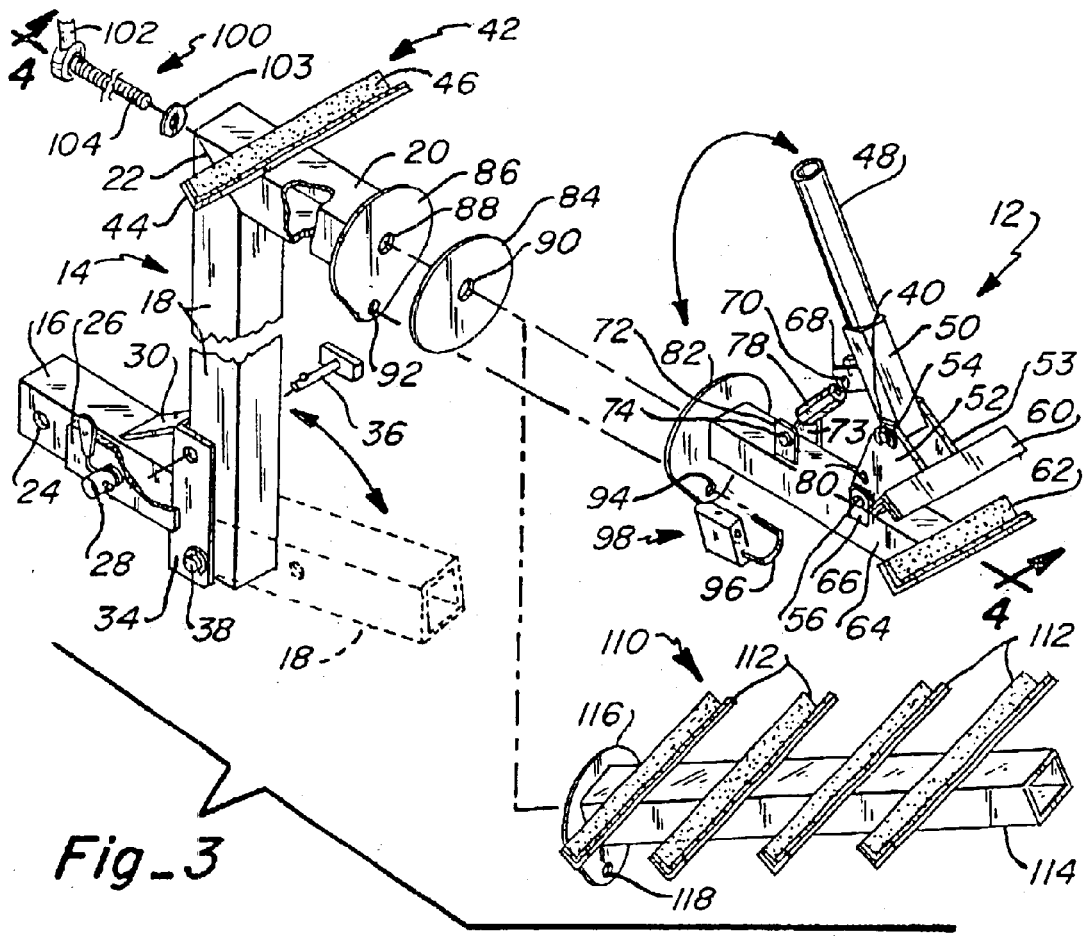
Fig_3
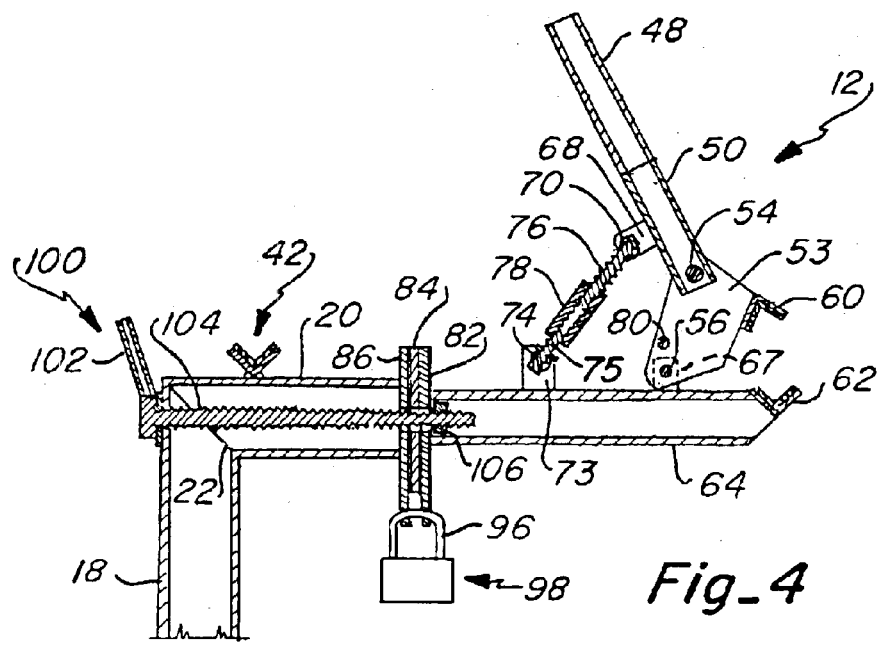
Fig_4

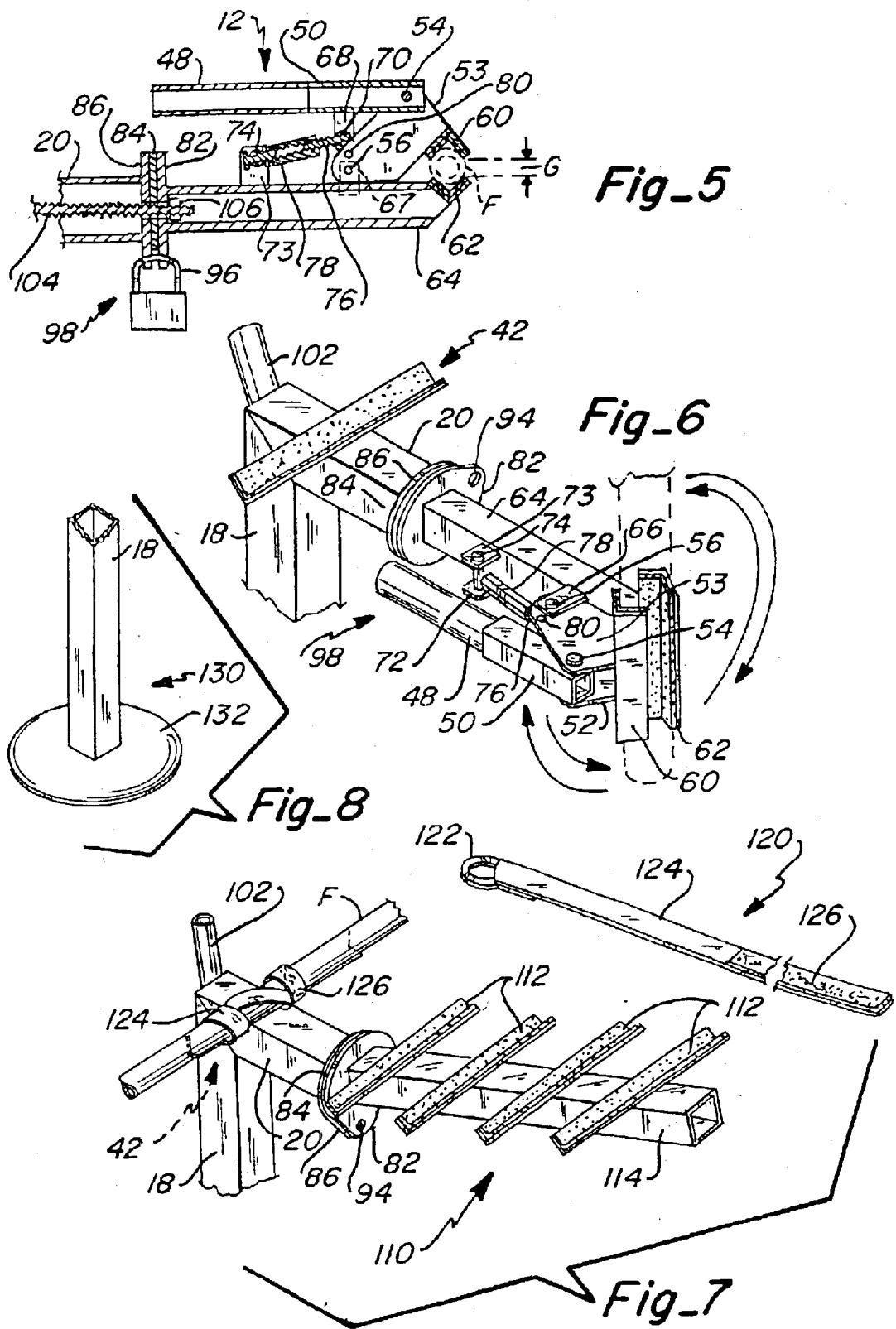

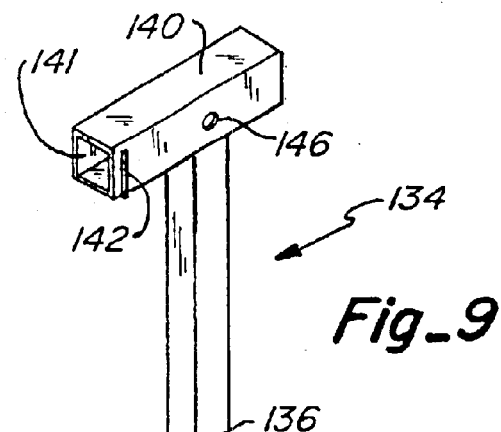
Fig_9
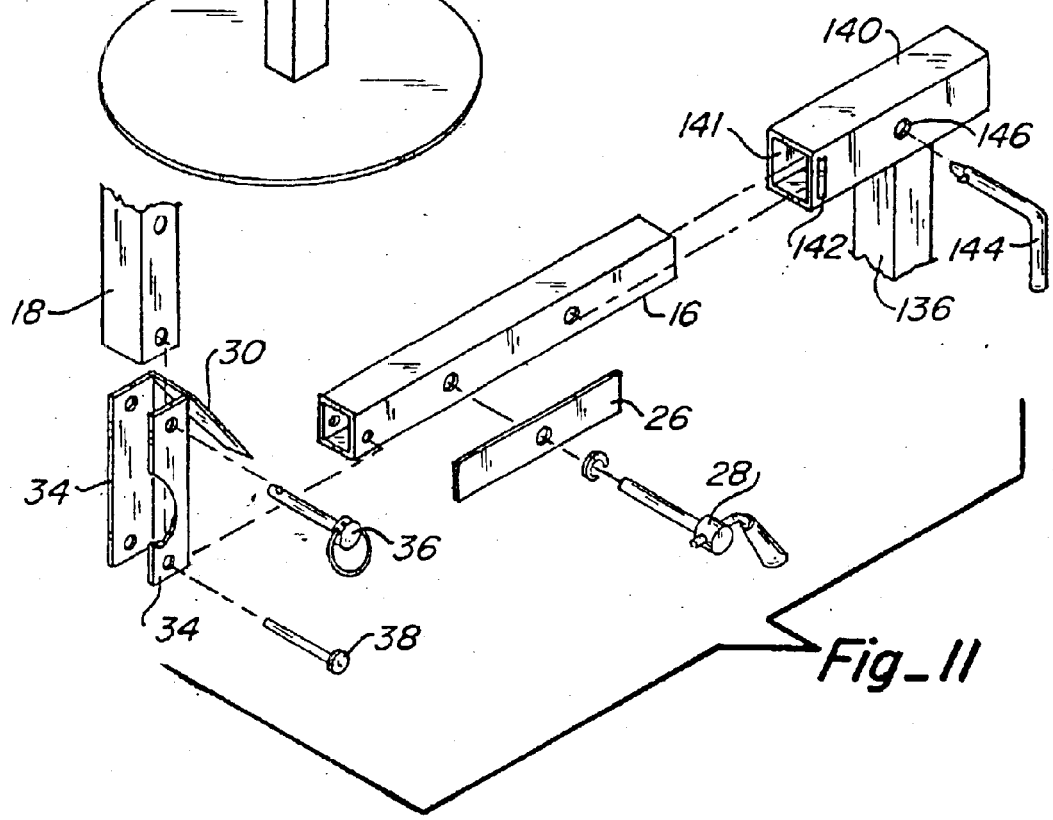
Fig_11
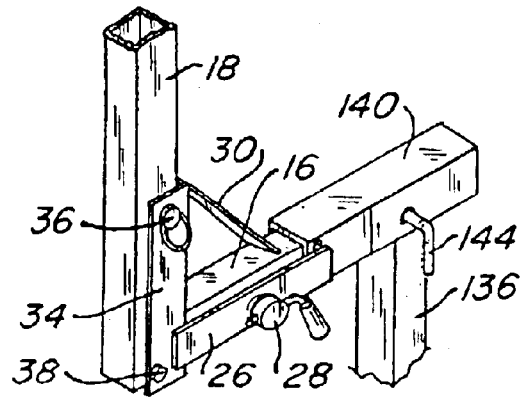
Fig_10

BICYCLE CAR RACK AND WORK STAND

CROSS REFERENCE TO RELATED APPLICATION

The present application is a continuation of U.S. patent application Ser. No. 09/776,968, filed Feb. 5, 2001, now U.S. Pat. No. 6,547,116, entitled "BICYCLE CAR RACK AND WORK STAND", which is incorporated herein by this reference.

FIELD OF THE INVENTION

The present invention relates generally to a device which secures an object such as a bicycle for transport and repair, and more particularly, to a combination bicycle car rack and work stand especially adapted for attachment to a motor vehicle.

BACKGROUND ART

A bicycle car rack is a common means of transporting bicycles on a vehicle. Typically, such racks utilize the vehicle's existing trailer hitch receiver as an attachment point. When the bicycle rack is not in use, the rack is simply disconnected from the receiver. A-well known device to secure a bicycle during repair is a portable repair stand. Typically, the portable repair stand includes a clamp which secures the bicycle at a desired location and orientation, and a base which supports the suspended bicycle.

A number of prior art references disclose both hitch racks and repair stands. One example of a reference which discloses a repair stand which mounts to a motor vehicle includes the U.S. Pat. No. 5,385,280. In this reference, a base member is adapted to connect to the receiver hitch of the vehicle. A riser member adjustable connects to the base member. A clamp support member projects horizontally from the riser member. The clamp support member includes a clamp which may secure the bicycle frame, or other components of the bicycle.

One example of a bicycle rack which is mounted to a vehicle includes the U.S. Pat. No. 4,676,413. This reference discloses a pair of frame mounting brackets secured to the frame of the vehicle. A rack assembly is supported by the frame mounting brackets. Bicycle hangar rods are secured to the top end of the rack assembly. One or more bicycles may be mounted on the rack assembly and secured by the hangar rods.

U.S. Pat. No. 3,981,491 is an example of a portable work stand. The work stand includes a pair of relatively movable jaws between which a tubular member of a bicycle may be securely clamped.

U.S. Pat. No. 5,277,346 discloses a clamping device especially adapted for securing bicycles thereto. The clamping device attaches to the trailer hitch of the vehicle. The clamping device includes cooperating clamping jaws which, once closed, are automatically locked in the closed position about the tubing of the bicycle.

Other examples of bicycle racks adapted for mounting to a vehicle include U.S. Pat. Nos. 5,277,346; 5,803,330; 4,676,414; 5,845,831; and 6,000,593. The purpose common to each of these references is a device which rigidly mounts one or more bicycles to a vehicle; however, no means is provided to orient a bicycle in a multitude of positions in accordance with functional attributes of a work stand. Thus, while the foregoing body of prior art indicates that it is known to support bicycles on vehicles for transporting the bicycles, or to mount a work stand to a vehicle for repair of a single bicycle, it is not contemplated to provide in a single device a combination work stand which enables one to exactly position a bicycle in a desired orientation, and simultaneously provide a bike carrier or bike rack to secure and transport additional bicycles on the same device.

SUMMARY OF THE INVENTION

The present invention, in broad terms, includes capabilities as both a work stand for repair and maintenance of a bicycle, and a bicycle car rack for securing and transporting one or more bicycles to a vehicle. Structurally, the bicycle car rack and work stand of the invention includes a support assembly characterized by an insert tube which is received in the receiver tube of the trailer hitch assembly, a vertical frame tube connected to the protruding end of the insert tube, and a horizontal frame tube connected to the upper end of the vertical frame tube. A clamp assembly is mounted on the horizontal frame tube and may be used to secure and precisely position a bicycle for maintenance or repair. One or more bike carrier members are provided to secure additional bicycles to the car rack and work stand. Optionally, the clamp assembly may be removed and replaced with a bike transport assembly which allows a number of additional bicycles to be secured to the device of this invention. The clamp assembly is adjustable to receive various sizes of bike tubing frames, or other components of a bicycle which must be secure for maintenance or repair.

The vertical frame tube pivotally connects to the receiver tube. A tilt lock pin is provided which allows the vertical frame tube to be secured in a vertical upright position or rotated downward to a more horizontal position. Additional structural support is provided in the form of an anti-sway plate which more rigidly secures the insert tube to the receiver tube of the trailer hitch assembly. A gusset may be provided to further support the vertical frame tube and the gusset, if used, acts as a cable pass-through.

The clamp assembly may be rotated to any desired position. A securing handle is used to engage or disengage a pair of clutch plates, and a user may then rotate the clamp assembly to the desired orientation while the clutch plates are disengaged.

The clamp assembly includes a clamp handle which manipulates an upper jaw of a pair of opposing jaw channels which secure the bicycle component therebetween. A lower jaw channel is fixed to a clamp support tube of the clamp assembly. The upper jaw channel moves with respect to the lower jaw channel, and can be locked into place by pushing down on the clamp handle tube. The gap between the upper and lower jaw channels may be adjustable by a barrel nut which provides linkage between the clamp handle and the clamp support tube. Accordingly, the clamp assembly is able to receive various sized bicycle components.

If there is no need for conducting repair or maintenance on a bicycle, the clamp assembly may be removed and replaced with a bike transport assembly which has a plurality of bike carrier channels. For each of the bike carrier channels, a tubular member of the bicycle rests in the channel, and then a strap may be used to secure the bicycle component to the particular channel.

Although this invention is adapted for attachment to a vehicle, the invention may also be disconnected from a vehicle and mounted to a stationary pedestal receiver.

The foregoing discussed advantages along with others will become apparent from a review of the description which follows in conjunction with the corresponding figures.

BRIEF DESCRIPTION OF THE DRAWINGS

FIG. 1 is a fragmentary perspective view of the bicycle car rack and work stand of this invention illustrating the clamp assembly attached, and the bicycle transport assembly detached;

FIG. 2 is a reduced perspective view of the device of this invention illustrating the invention mounted to the trailer hitch assembly of a vehicle, and also illustrating a bicycle secured by the clamp assembly;

FIG. 3 is a fragmentary exploded perspective view of the device of this invention illustrating both the clamp assembly and bike transport assembly detached from the support assembly;

FIG. 4 is a vertical section, taken along line 4—4 of FIG. 3, illustrating the device of the invention assembled and with the clamp assembly illustrated in the open position;

FIG. 5 is another vertical section, taken along line 4—4 of FIG. 3, illustrating the clamp assembly in the closed position for securing a component of a bicycle;

FIG. 6 is a fragmentary perspective view illustrating the rotational capability of the clamp assembly;

FIG. 7 is a another fragmentary perspective view illustrating the bike transport assembly attached, and further showing a component of a bicycle mounted to one of the bike carrier channels as by a strap assembly;

FIG. 8 is a perspective view of a pedestal assembly which is integral with the device of this invention;

FIG. 9 is a perspective view of a pedestal receiver which may be used when the device is removed from its mounted position on a vehicle;

FIG. 10 is a fragmentary perspective view showing the receiver of FIG. 9 in use; and FIG. 11 is an exploded perspective view of FIG. 10.

DETAILED DESCRIPTION

FIG. 1 illustrates the car rack and work stand 10 of this invention. The device includes three major assemblies, namely, a clamp assembly 12, a support assembly 14, and a bike transport assembly 110. As shown in FIG. 2, the support assembly 14 includes a horizontally extending insert tube 16 which is inserted in the receiver tube T of the trailer hitch assembly of a vehicle V. The support assembly 14 further includes a vertical frame tube 18 which rotatably connects to insert tube 16 as by tilt swivel pin 38. The upper end of frame tube 18 connects to horizontal frame tube 20 as by a welded connection along seam 22. The insert tube 16 includes one or more mounting pin holes 24 drilled transversely through the tube 16. Mounting pin P may then secure the insert tube 16 by inserting the pin P through the hole in receiver tube T and the aligned mounting pin hole 24. FIG. 2 shows but one means by which the device of this invention may be attached to the trailer hitch assembly of a vehicle. The arrangement shown in FIG. 2 is one of the more common trailer hitch assemblies found on many modern vehicles. As well understood by those of skill in the art, insert tube 16 could be modified or adapted for connection to other types of trailer hitch assemblies.

In order to enhance the structural integrity and stability of the device, an anti-sway plate 26 is provided, along with tensioner 28. As shown in FIG. 2, anti-sway plate 26 overlaps the interface between receiver tube T and insert tube 16. Tensioner 28 is tightened which then stabilizes the connection between receiver tube T and insert tube 16. Further structural support is provided by angled gusset plate 30 which is welded to the vertical frame tube 18. A pair of securing plates 34 which are provided for extra structural support receive both the tilt swivel pin 38 and tilt lock pin 36. As shown in FIG. 3, the tilt lock pin 36 may be removed which allows vertical frame tube 18 to rotate. Tilt swivel pin 38 remains attached. It may be necessary to rotate vertical frame tube 18 if the device of this invention is mounted to the trailer hitch assembly of a pick-up truck, or other recreational vehicle which has a tailgate. Rotation of frame tube 18 to the more horizontal position would allow the tailgate to be opened.

The horizontal frame tube 20 has mounted thereto one or more bicycle carrier channels 42. FIG. 1 illustrates just one bike carrier channel 42; however, it is well within the scope of this invention to have additional bike carrier channels 42, depending upon the length of frame tube 20. Bike carrier channel 42 includes a lower support member 42, and a rubber or resilient covering 46 overlying the support member 44. As best seen in FIG. 4, the bike carrier channel is a v-shaped member which is simply welded to the upper surface of frame tube 20.

Now referring to FIGS. 1, 3, 4, 5 and 6, the clamp assembly 12 will now be explained in more, detail. The clamp assembly 12 includes a clamp handle tube 48 which is grasped by the user and is positioned either in the open position as shown in FIG. 3, or in the closed position as shown in FIG. 1. The clamp handle tube 48 connects to clamp handle square 50. A pair of clamp side plates 52 and 53 serves as the primary linkage members. As shown, handle pivot pin 54 is inserted between the plates 52 and 53 and thus rotatably connects handle square 50 to plates 52 and 53. A pair of jaw pivot mounts 66 and 67 attached to the upper surface of clamp support tube 64. Jaw pivot pin 56 is inserted between pivot mounts 66 and 67, and thus rotatably attaches side plates 52 and 53 to the mounts 66 and 67. A clip may be used to secure pins 54 and 56 as necessary, and which allows more easy disassembly of this clamp assembly. Upper jaw channel 60 attaches to the forward or distal ends of side plates 52 and 53, as best seen in FIG. 4. Lower jaw channel 62 is mounted to the most forward or distal end of clamp support tube 64. An upper handle pivot mount 68 is mounted to the lower or under side edge of clamp handle square 50. A pair of lower handle pivot mounts 72 and 73 as best seen in FIG. 3 are mounted to the clamp support tube 64 proximally of the jaw pivot mounts 66 and 67. Threaded rod 76 extends from mount 68 and is secured by pivot mount pin 70. A barrel nut 78 is screwed over the free end of threaded rod 76. As shown in FIG. 4, the lower end of barrel nut 78 attaches to extension 75 which is rotatably secured between mounts 72 and 73 by pin 74. The barrel nut can be screwed or unscrewed along the threaded rod 76 to change the effective length of the linkage between upper pivot mount 68 and lower pivot mounts 72 and 73.

When the clamp handle tube 48 is lifted to the more vertical orientation, jaw 60 is separated from jaw 62. When the tube 48 is pushed down to the more horizontal orientation, upper jaw of channel 60 moves towards lower jaw channel 62. As best seen in FIG. 6, a stop tab 80 mounts horizontally between side plates 52 and 53, and serves as a stop to limit the downward travel of clamp handle tube 48 by contact with the lower edge of upper pivot mount 68. As best seen in FIG. 5, a portion of the frame F of a bicycle is locked between jaws 60 and 62. The gap G between jaws 60 and 62 can be changed to accommodate-the particular sized frame member which is secured between the jaws by screwing or unscrewing the barrel nut 78 over threaded rod 76.

As shown in FIG. 6, the clamp assembly 12 may be rotated to any desired position. This capability is achieved by clutch plates 82 and 86 which may be engaged or disengaged by securing handle 100. More specifically, clutch plate 82 is secured to the proximal end of clamp support tube 64. Clutch plate 86 is secured to the distal or forward end of horizontal frame tube 20. A clutch plate bushing 84 is positioned between the clutch plates 82 and 86. The securing handle 100 includes an elongate threaded bolt 104 which is inserted through an opening on the upper end of vertical frame tube 18, and extends internally through frame tube 20. The threaded bolt 104 further extends through an opening 88 in clutch plate 86, opening 90 in bushing 84, and through a central opening in clutch plate 82. A grip 102 attaches to the proximal end of threaded bolt 104. As shown in FIG. 4, an internal securing nut 106 is rigidly mounted within the interior of support tube 64, and the distal end of the threaded bolt 104 also extends through the securing nut 106. If it is desired to rotate the clamp assembly, grip 102 is unscrewed thus loosening clutch plates 82 and 86. The clamp assembly is rotated to the desired orientation, and then grip 102 is tightened thus forcing clutch plates 82 and 86 back against one another. Washer 103 may be mounted over threaded bolt 104 to help prevent damage against the exterior surface of tube 18 due to contact with the grip 102.

Hasp openings 92 and 94 may be drilled through clutch plates 86 and 82, which allows a lock 98 having a hasp 96 to pass therethrough, as shown in FIG. 4. Thus, the clamp assembly can be locked to prevent theft.

Now referring to FIG. 7, the bike transport system 110 is shown mounted to support assembly 14. The bike transport assembly includes a plurality of bike carrier channels 112, mounted to the support tube 114. As with the clamp assembly, the bike transport assembly 110 also includes its own clutch plate 116 which mounts against clutch plate 86. Thus, the bike transport assembly 110 may also be rotated to the desired orientation. However, the most common and efficient orientation of the bike transport assembly is when the carrier channels 112 are maintained in a horizontal orientation. The bike carrier channels 112 are constructed in the same manner as carrier channel 42, and are simply welded to the support tube 114. In order to lock the bike transport assembly to the support assembly, bike transport assembly also includes a hasp opening 118 which may be aligned with hasp opening 92 to receive the hasp 96 of lock 98. Although a bike transport assembly 110 has been illustrated, it shall be understood that the device of this invention can also be used in conjunction with other types of securing assemblies such as an assembly for securing skis or other objects. Thus, the ski rack would simply have to include some means for connection to the clutch plate 86, preferably a clutch plate like clutch plate 116 of the bike transport assembly 110. Those skilled in the art can envision other specific objects which might be transported by the device of this invention.

A strap assembly 120 as of the type shown in FIG. 7 may be used to secure the bicycles to the bike carrier channels. One particularly effective strap assembly 120 includes a loop 122, a strap portion 124, and hook and pile material 126. The strap assembly 120 can simply be wrapped around the frame F of the particular bicycle, and around the corresponding bike carrier channel. Those skilled in the art can envision other types of strap assemblies which may be used to secure the frame or other components of a bicycle to the bike carrier channels.

FIG. 8 shows an alternative embodiment wherein the device of the invention is not mounted to a vehicle, but rather is permanently mounted to a stationary pedestal. As shown, this stationary embodiment pedestal assembly 130 simply comprises the vertical tube 18 attached to a base 132. The base 132 is of sufficient weight and size to stabilize the upper components of the device, or the base 132 can be of a smaller size and bolted to the floor for support.

FIGS. 9–11 illustrate yet another alternative embodiment of the invention which allows the invention to be adapted for mounting to another type of stationary base or pedestal. As shown in FIG. 9, this base 134 includes a vertical support member 136 having a lower end attached to base support member 138. The upper end of vertical support member 136 attaches to horizontal receiving member 140. Once the device is removed from a vehicle, the free end of insert tube 16 is inserted within the opening 141 of Horizontal receiving member 140. One of the holes in insert tube 16 is aligned with hole 146 and a pin 144 may be used to secure the connection of insert tube 16 and receiving member 140. A small flange 142 may be welded to horizontal receiving member 140. This flange 142 helps to assure that anti-sway plate 26 sets flush against securing plate 34 and against the flange 142.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A combination bicycle rack and work stand device for attachment to a vehicle comprising:

a support assembly attached to the vehicle, said support assembly including a support member spaced from the vehicle;

a clamp assembly mounted to support member and rotatable about said support member, said clamp assembly having upper and lower jaws for or selective and releasable engagement of an object to be secured;

a clamp handle hingedly mounted to said clamp assembly for selectively opening and closing said upper and lower jaws;

means for adjusting a gap between said upper and lower jaws thereby accommodating different sized object to be secured by said clamp assembly, said means for adjusting including a pair of complementary threaded members with at least one member of said pair of members being hingedly connected to said handle; and means for rotating said clamp assembly about said support member and to maintain said clamp assembly at a substantially fixed distance from the vehicle.

2. The combination, as claimed in claim 1, further including:

a carrier member spaced from said clamp assembly and mounted on said support member for securing a second object.

3. A combination bicycle rack and work stand for attachment to a vehicle comprising:

a support assembly attached to the vehicle, said support assembly including a support member spaced from the vehicle;

a champ assembly mounted to said support member and rotatable about said support member, said clamp assembly having upper and lower jaws for selective and releasable engagement of an object to be secured;

a clamp handle hingedly mounted to said clamp assembly for selectively opening and closings said upper and lower jaws;

means for adjusting a gap between said upper and lower jaws thereby accommodating different sized objects to be by said clamp assembly, said upper jaw being connected to said clamp handle and said gap being adjusted by moving said upper jaw to and away form said lower jaw, said lower jaw remaining stationary; and means for rotating said clamp assembly about said support member and to maintain said clamp assembly at a substantially fixed distance from the vehicle.

4. The combination, as claimed in claim 3, further including:

a carrier member spaced from said clamp assembly and mounted on said support member for securing a second object.

5. A method of securing plurality of object to a combination bicycle and work stand device, said method comprising the steps of:

providing the combination bicycle rack and work stand device including a support assembly for attaching the device to the vehicle, a rotatable clamp assembly, the rotatable clamp assembly including means for adjusting a gap between upper and lower jaws of clamp assembly thereby accommodating different sized object to be secured by said clamp assembly, and a carrier element mounted to the support assembly;

securing the combination bicycle rack and work stand device to the vehicle;

securing a first object to the clamp assembly;

rotating the clamp assembly to a desired position while maintaining the clamp assembly at a substantially fixed distance from the vehicle; and securing a second object to the carrier element while said first object is secured to the clamp assembly.

* * * * *

UNITED STATES PATENT AND TRADEMARK OFFICE
CERTIFICATE OF CORRECTION

PATENT NO. : 6,854,630 B2
DATED : February 15, 2005
INVENTOR(S) : Evan R. Anderson et al.

It is certified that error appears in the above-identified patent and that said Letters Patent is hereby corrected as shown below:

Column 6,
Line 31, please delete "or" therein.
Line 55, please delete "champ" and insert -- clamp -- therein.
Line 60, please delete "closings" and insert -- closing -- therein.
Line 64, after "be" please insert -- secured -- therein.

Column 7,
Line 1, please delete "form" and insert -- from -- therein.
Line 12, after "securing" please insert -- a -- therein.
Line 12, please delete "object" and insert -- objects -- therein.

Column 8,
Line 3, after "of" please insert -- the -- therein.
Line 4, please delete "object" and insert -- objects -- therein.

Signed and Sealed this

Twenty-fourth Day of May, 2005

JON W. DUDAS
*Director of the United States Patent and Trademark Office*